(12) United States Patent
Traversa et al.

(10) Patent No.: US 9,630,774 B2
(45) Date of Patent: Apr. 25, 2017

(54) AUTOMATED WAREHOUSES

(71) Applicant: EUROFORK S.r.l., Carignano (Turin) (IT)

(72) Inventors: Maurizio Traversa, Carmagnola (IT); Claudio Fedi, Prato (IT); Alessandro Garola, Cavour (IT)

(73) Assignee: EUROFORK S.R.L., Carignano (Turin) (IT)

( * ) Notice: Subject to any disclaimer, the term of this patent is extended or adjusted under 35 U.S.C. 154(b) by 0 days.

(21) Appl. No.: 14/901,087

(22) PCT Filed: Apr. 11, 2014

(86) PCT No.: PCT/IB2014/060649
§ 371 (c)(1),
(2) Date: Dec. 28, 2015

(87) PCT Pub. No.: WO2015/011575
PCT Pub. Date: Jan. 29, 2015

(65) Prior Publication Data
US 2016/0137418 A1    May 19, 2016

(30) Foreign Application Priority Data
Jul. 24, 2013   (IT) ................................. TO13A0628

(51) Int. Cl.
*B65G 1/06*    (2006.01)
*B65G 1/04*    (2006.01)
*B65G 1/137*   (2006.01)

(52) U.S. Cl.
CPC ........... *B65G 1/065* (2013.01); *B65G 1/0414* (2013.01); *B65G 1/0492* (2013.01); *B65G 1/1371* (2013.01)

(58) Field of Classification Search
CPC .... B65G 1/0492; B65G 1/0414; B65G 1/065; B65G 1/1371
USPC .................................................. 414/279, 284
See application file for complete search history.

(56) References Cited

U.S. PATENT DOCUMENTS

| | | | | |
|---|---|---|---|---|
| 1,824,201 A | * | 9/1931 | Eisenberg | B62B 3/0625 187/403 |
| 1,830,740 A | * | 11/1931 | Leech | B61D 3/20 414/396 |
| 1,903,274 A | * | 3/1933 | Watson | E04H 6/183 212/327 |

(Continued)

FOREIGN PATENT DOCUMENTS

WO    2012127419 A1    9/2012

*Primary Examiner* — Kaitlin Joerger
(74) *Attorney, Agent, or Firm* — Robert E. Alderson, Jr.

(57) ABSTRACT

Automated warehouses are provided which include a main path, a series of secondary paths perpendicular to the main path along which storage stations are defined, suitable for receiving cargo units. In order to move the cargo units, a main self-propelled vehicle is movable along the main path, and is associated with an auxiliary self-propelled vehicle, movable along the secondary paths. Location data representations are provided along the paths, which identify absolute positions of reference points or ranges within the automated warehouse. Sensors to read the data are mounted on board of the main self-propelled vehicle and the auxiliary self-propelled vehicle. Methods for storing and withdrawing cargo units in automated warehouses are also provided.

10 Claims, 7 Drawing Sheets

(56) References Cited

U.S. PATENT DOCUMENTS

| | | | | |
|---|---|---|---|---|
| 2,633,809 A * | 4/1953 | Robinson, Jr. | E04H 6/282 | 104/162 |
| 2,763,381 A * | 9/1956 | Bowles | E04H 6/183 | 414/246 |
| 3,389,814 A * | 6/1968 | Lemelson | B65G 1/0421 | 200/61.41 |
| 3,531,705 A * | 9/1970 | Rosin | B65G 1/0421 | 318/162 |
| 3,543,952 A * | 12/1970 | Young | B65G 1/0414 | 414/140.3 |
| 3,559,822 A * | 2/1971 | Lichtenford | B65G 1/0407 | 414/140.3 |
| 3,850,316 A * | 11/1974 | Schmitt | B65G 1/06 | 414/152 |
| 3,883,013 A * | 5/1975 | Nakanishi | B65G 1/00 | 414/281 |
| 3,927,773 A * | 12/1975 | Bright | B65G 1/06 | 414/273 |
| 3,982,639 A * | 9/1976 | Haldimann | B62B 3/04 | 414/276 |
| 3,995,752 A * | 12/1976 | Tamura | B65G 1/0407 | 414/282 |
| 4,085,849 A * | 4/1978 | Jablin | C10B 41/00 | 212/329 |
| 4,144,818 A * | 3/1979 | Fletcher | B65H 67/06 | 104/162 |
| 4,191,499 A * | 3/1980 | Futer | B65G 47/5109 | 261/120 |
| 4,265,583 A * | 5/1981 | Baird | B66F 9/12 | 414/246 |
| 4,299,496 A * | 11/1981 | Lord | B65G 1/0414 | 250/224 |
| 4,372,724 A * | 2/1983 | Stolzer | B65G 1/0442 | 414/254 |
| 4,541,766 A * | 9/1985 | Dahl | B65G 1/0442 | 414/277 |
| 4,639,187 A * | 1/1987 | Maruyama | B65G 1/133 | 198/465.1 |
| 4,718,810 A * | 1/1988 | Hoehn | B23Q 7/1442 | 104/45 |
| 4,729,467 A * | 3/1988 | Vanderlinde | B65G 1/06 | 198/586 |
| 4,890,969 A * | 1/1990 | Esser | B23Q 3/15526 | 198/346.2 |
| 5,054,986 A * | 10/1991 | Hirano | B65G 1/04 | 104/137 |
| 5,098,246 A * | 3/1992 | Jung | E04H 6/422 | 414/239 |
| 5,125,782 A * | 6/1992 | Goldschmidt | B65G 1/06 | 198/347.1 |
| 5,226,782 A * | 7/1993 | Rigling | B65G 1/0407 | 198/347.3 |
| 5,286,157 A * | 2/1994 | Vainio | B65G 1/0414 | 414/273 |
| 5,379,229 A * | 1/1995 | Parsons | B65G 1/1378 | 414/273 |
| 6,652,213 B1 * | 11/2003 | Mitchell | B65G 1/0492 | 414/279 |
| 7,080,739 B2 * | 7/2006 | Guy | B07C 3/008 | 198/369.1 |
| 7,261,509 B2 * | 8/2007 | Freudelsperger | B65G 1/1378 | 414/269 |
| 7,591,630 B2 * | 9/2009 | Lert, Jr. | B65G 1/0492 | 414/279 |
| 8,393,475 B2 * | 3/2013 | Hugues | B07C 7/02 | 209/630 |
| 8,694,152 B2 * | 4/2014 | Cyrulik | B65G 1/0492 | 700/214 |
| 8,696,010 B2 * | 4/2014 | Toebes | B65G 13/00 | 280/400 |
| 8,965,619 B2 * | 2/2015 | Sullivan | G05D 1/0272 | 180/168 |
| 8,998,554 B2 * | 4/2015 | Toebes | B65G 1/04 | 414/273 |
| 9,037,286 B2 * | 5/2015 | Lert | B65G 1/1378 | 414/279 |
| 9,051,120 B2 * | 6/2015 | Lert | B65G 1/045 | |
| 9,187,244 B2 * | 11/2015 | Toebes | B65G 1/0492 | |
| 9,321,591 B2 * | 4/2016 | Lert | B65G 1/0492 | |
| 9,327,903 B2 * | 5/2016 | Toebes | B65G 1/065 | |
| 2009/0074545 A1 | 3/2009 | Lert, Jr. et al. | | |

* cited by examiner

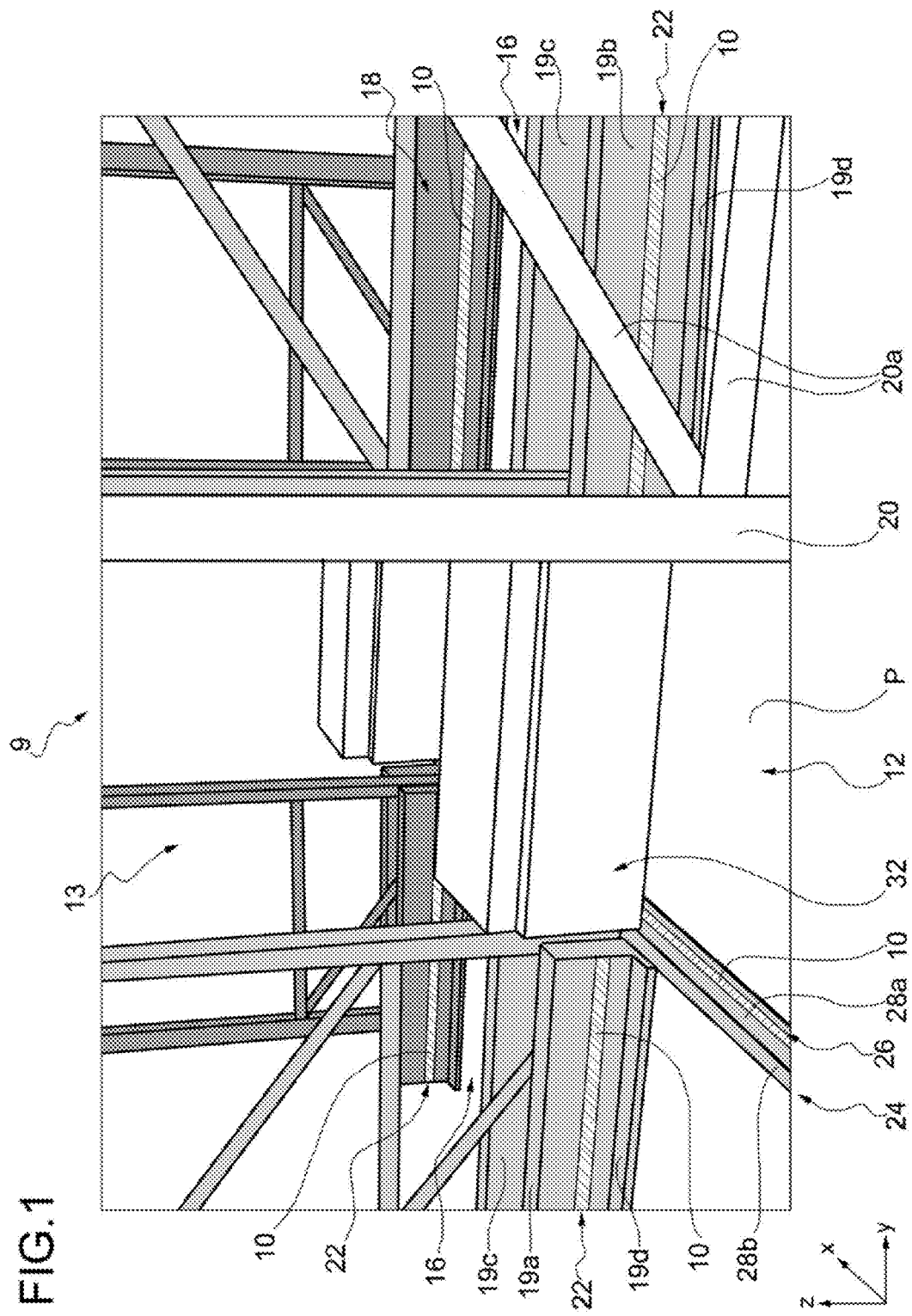

AUTOMATED WAREHOUSES

CROSS-REFERENCE TO RELATED APPLICATIONS

This application is a National Phase Application of PCT International Application No. PCT/IB2014/060649, International Filing Date, Apr. 11, 2014, claiming priority to Italian Patent Application No. TO2013A000628 (102013902178154), filed Jul. 24, 2013, each of which is hereby incorporated by reference in its entirety.

FIELD OF THE INVENTION

The present invention relates to an automated warehouse with a system for moving cargo units by means of shuttles and satellites, of the type described and claimed herein.

BACKGROUND OF THE INVENTION

A warehouse that has such a structure, in place of the bulky and energy-intensive conventional translation-lifting devices of the Cartesian type, has more compact movement means, generally comprising a first primary means (referred to as a "shuttle"), and a second auxiliary means (referred to as a "satellite"), operatively connected to the first primary means.

The shuttle moves along a main aisle, defined at the sides thereof by the warehouse shelves, which shelves provide a plurality of stations, along secondary aisles, where the cargo units can be housed. Once the shuttle has reached the secondary aisle at which the station where a load has to be deposited or withdrawn is located, the satellite disconnects from the shuttle, which satellite, moving along the secondary aisle, materially carries out the unit unloading or withdrawing operation. The shuttle, during the above-mentioned operation, remains stationary, waiting for the satellite to come back.

The automated storage system just described suffers from two kinds of problems, related to the precision of the displacements of the shuttle and the satellite, as well as the optimization of the operative times.

A first problem relates to the accuracy with which the proper positioning of the movement means within the warehouse can be controlled. Current position feedback systems, generally based on encoder transducers, suffer from errors due to stacking up of the shelving constructive tolerances, the latter increasing more and more as the warehouse dimensions increase.

Wear is another factor contributing to decrease the reliability of the current solutions for controlling the positioning. For example, an encoder detecting the rotation of vehicle wheels, converting the number of recorded rotation in a linear length, suffers from the same wheel wear, since the conversion algorithm continues to operate based on values that do not correspond to the real ones. Vibrations or slips of the wheels may also affect the correctness of the assessment of the handling vehicles positioning.

A second problem relates to the downtimes the various handling operations. Downtimes are due to the fact that the shuttle, before moving again, has to wait for the completion of the withdrawal or deposition operation of the load by the satellite.

SUMMARY OF THE INVENTION

The object of the present invention is to obviate both problems in a cost-effective and efficient manner.

With conventional systems, the location estimation is obtained by measuring a distance, calculated in an absolute or incremental manner, with respect to a predetermined reference point (causing the above-mentioned estimation errors). Conversely, an automated warehouse according to the present invention is provided with a system that detects an absolute position datum (and not a distance). Such a position datum is based on a reference system that is external, stationary, and independent from shuttle and satellite. This solution, which allows setting the absolute position of the handling modulus even in the case of manual restart or handling operations by the operators, is carried out by means of data representations, preferably of the optical type (for example, of the "bar codes" type). Such representations are interpreted by special reading devices (in the case of bar codes, the reading devices are of the optical type). In this manner, the problem of uncertainty in location estimation is solved.

With reference to the operation times, a clear improvement in the storage system performance is achieved, according to the present invention, by making the movements of shuttle and satellite mutually independent, so that the shuttle, unlike in the prior art, can carry out other operations while the satellite is engaged in a mission.

The above and other objects and advantages are achieved, according to aspects of the invention, by systems having the features described and claimed herein.

Several alternative embodiments of the invention will be now described, with reference to the attached drawings.

BRIEF DESCRIPTION OF THE FIGURES

FIG. 1 is a schematic perspective view of an automated warehouse, according to an embodiment of the present invention;

DETAILED DESCRIPTION

Figure 2A:
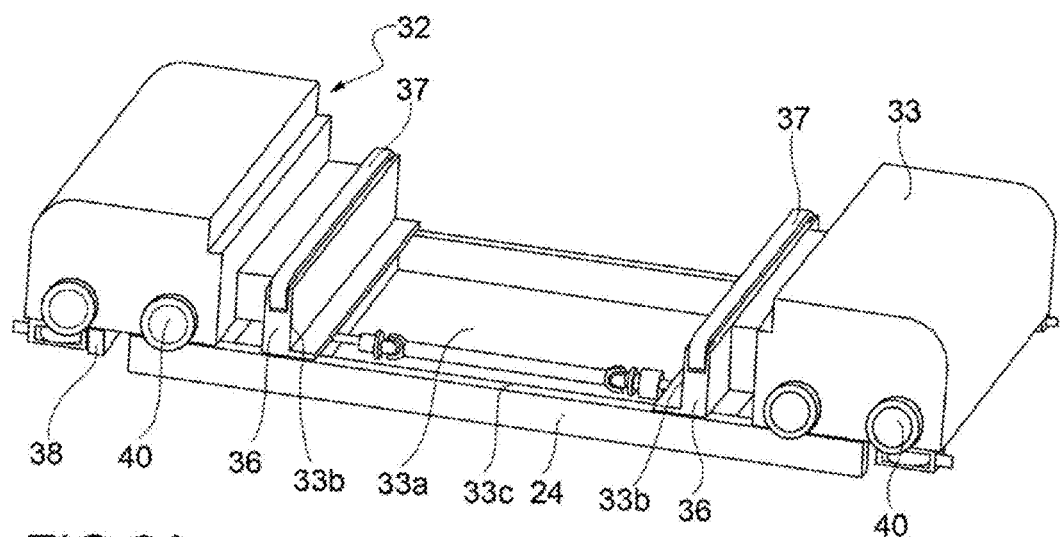
FIG. 2A is a schematic axonometric view of a first vehicle provided in the warehouse of FIG. 1.

Before embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

With reference to FIG. 1, a preferred, non-limiting embodiment of an automated warehouse 9 according to the present invention is described. A warehouse, of the type described below, provides a main path or aisle 12 extending according to a longitudinal direction, parallel to the axis x.

Throughout the present description and in the claims, the terms and phrases indicating positions and orientations, such as "longitudinal", "vertical", or "transversal", are to be meant as referring to the axis x.

The main aisle 12 is defined, along all or part of the length thereof, by two parallel side primary guides 24, acting as a support for rotation elements. The guides are obtained by a plurality of sectional shapes, preferably by means of box-shaped, metal section bars, in the form of an inverted U, a C, a Z shape, etc. Each primary guide 24 generally provides a first vertical inner face 28*a*, facing toward the main aisle, a second outer face vertical 28*c* parallel to the first one, and a planar upper, horizontal face 28*b* for the connection between the first and the second faces.

The horizontal faces 28*b* act as supporting and sliding surfaces for a plurality of wheels 40 of a self-propelled apparatus 30 (illustrated in FIG. 2C) for moving cargo units 11. The apparatus 30 comprises, in a non-limiting embodiment, a first main vehicle 32 (referred to herein below as "shuttle", and illustrated in detail in FIG. 2A), and a second auxiliary vehicle 34 (referred to herein below as "satellite", and illustrated in detail in FIG. 2B). The second vehicle is able to be transported by the first vehicle by accommodating in a special seat 33*a* obtained in a structure 33 of the shuttle 32.

Preferably, the seat 33*a* is defined in the longitudinal direction by two uprights 36, having vertical edges 33*b*. The uprights 36 act as rest surfaces for the cargo units 11. The cargo units 11 usually comprise a pallet 11*a* supporting a load 11*b* (FIG. 3).

The satellite 34 comprises a structure 42, a plurality of wheels 46, and elements 35 for withdrawing or depositing the cargo unit 11. Cargo unit 11 is located in a shelving 13 that is arranged at a side of the main aisle 12. The elements 35 comprise, according to an embodiment of the invention, a rest plate 35*a* that may be lifted by means of a pantograph mechanism 35*b*, or, optionally, by means of jacks or actuators of another kind.

Figure 3:
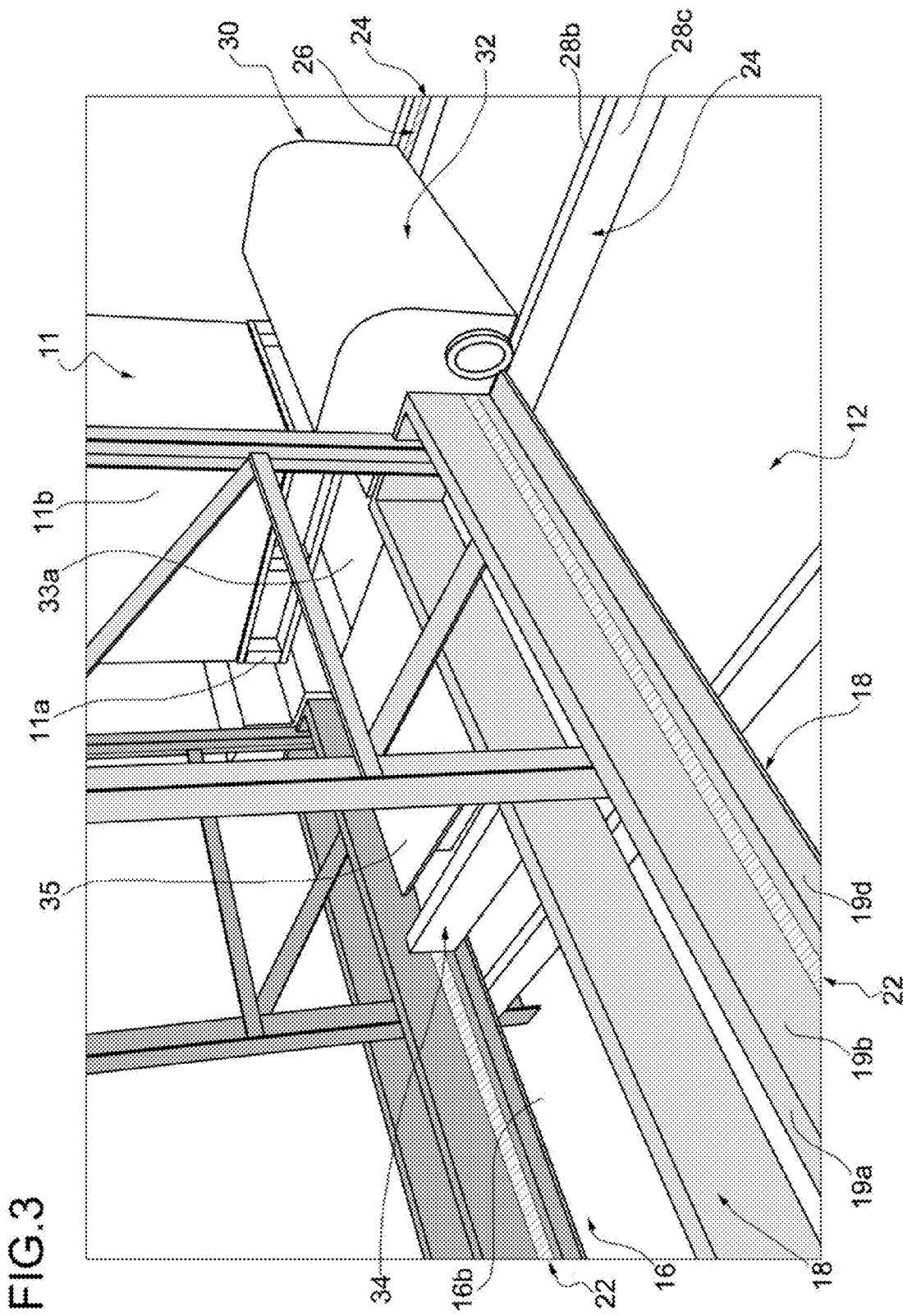
FIG. 3 is a schematic perspective side view of a detail of the warehouse in FIG. 1.

The shelving 13, as illustrated in the FIGS. 1 and 3, is supported by a plurality of uprights 20 and ribs 20*a*, and it provides a plurality of secondary paths 16, arranged along a direction transversal or perpendicular with respect to the main aisle 12. The secondary paths 16 are defined, along all or part of the length thereof, each by two secondary side guides 18. These guides are preferably obtained with box- or inverted U-shaped metal section bars. Each secondary guide 18 provides a first vertical inner face 19*b*, facing toward the secondary path 16, a second vertical outer face 19*c* parallel to the first face, a horizontal connection face 19*a* between the first and the second faces, and a flat projection 19*d*, facing toward the secondary path 16, acting as a supporting and sliding surface for the wheels 46 of the satellite 34. Each secondary path 16 comprises one or more boxes 16*b* to accommodate the cargo units 11.

In an advantageous embodiment of the warehouse (shown in FIG. 1), the shelves 13 are provided on both longitudinal sides of the main aisle 12. Optionally, multiple central aisles 12 may be provided, interspersed with the shelves 13. Furthermore, the shelves are generally multi-floor shelves, extending also vertically, in addition to longitudinally and transversally, i.e., comprising one or more mutually overlying floors 14. Each floor 14 provides a plurality of secondary paths 16, according to the forms described above. A respective main aisle 12 is flanked to each floor 14, thus determining an overlapping and a spacing of the central aisles 12 along the vertical axis z.

According to a non-illustrated embodiment, multiple shuttles and/or satellites may operate on each of the central aisles 12.

As shown in FIG. 1, one of the two primary guides 24 suitably provides a data representation 26 on the inner face 28*a*, in this example, an optical representation in the form of a linear bar code. Said embodiment of the representation 26 is not to be construed as limiting as regards:

the mode of representing data in an optical form (linear, matrix, three-dimensional bar code, etc.); in other, not-illustrated embodiments, the data representation may be of a magnetic type, or applied/incorporated onto supports of a still different type;

the application surface (the representation 26 can be provided, concomitantly or alternately, on one or more faces 28*a*, 28*b*, 28*c* of the section bar 24);

the guide on which the representation 26 is provided (it may be provided on one of the two guides, according to the embodiment illustrated in FIG. 1, or on both guides, according to a not-illustrated embodiment);

the system for connecting the representation 26 to the guide 24 (by gluing, screwing, welding, overprinting, etc.); and the material for manufacturing the representation 26 (adhesive tape, plastic, metal, etc.).

As shown by the FIGS. 1 and 3, one of the two secondary guides 18 suitably provides, on the inner face 19*b*, a data representation 22, in this example, an optical representation in the form of a linear bar code. The observations given for the representation 26 about the data representation modes, the application surface of the representation 22, the guide on which the representation is provided, the connection system of the representation 22 to the guide 18, the material for manufacturing the representation 22, apply also to the data representation 22.

Figure 4:
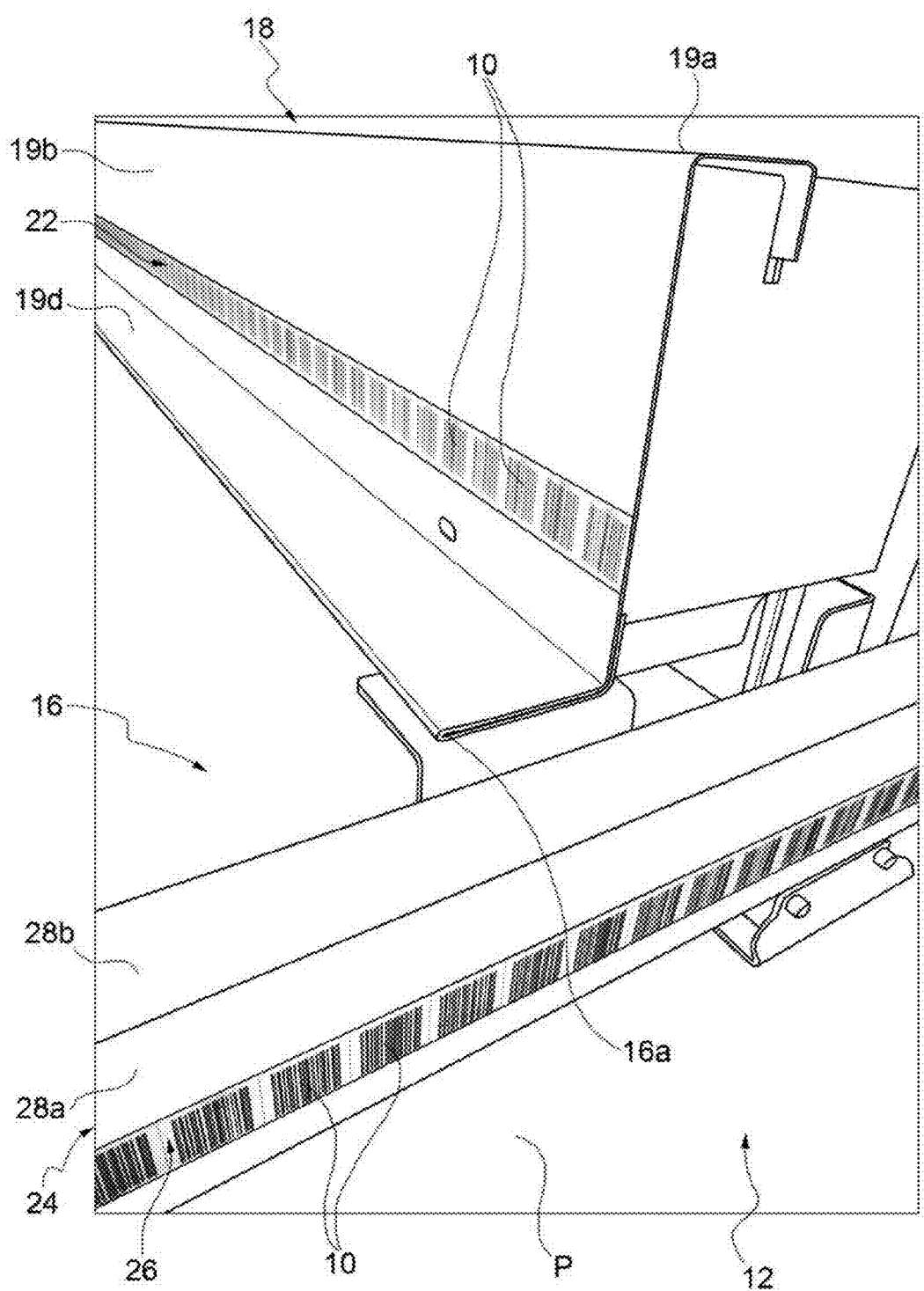
FIG. 4 is a schematic perspective side view of a detail of the warehouse in FIG. 1.

FIG. 4 shows a detail of a preferred embodiment of the arrangement of the data representations 22, 26 on a primary guide 24 and a secondary guide 18.

Figure 5:
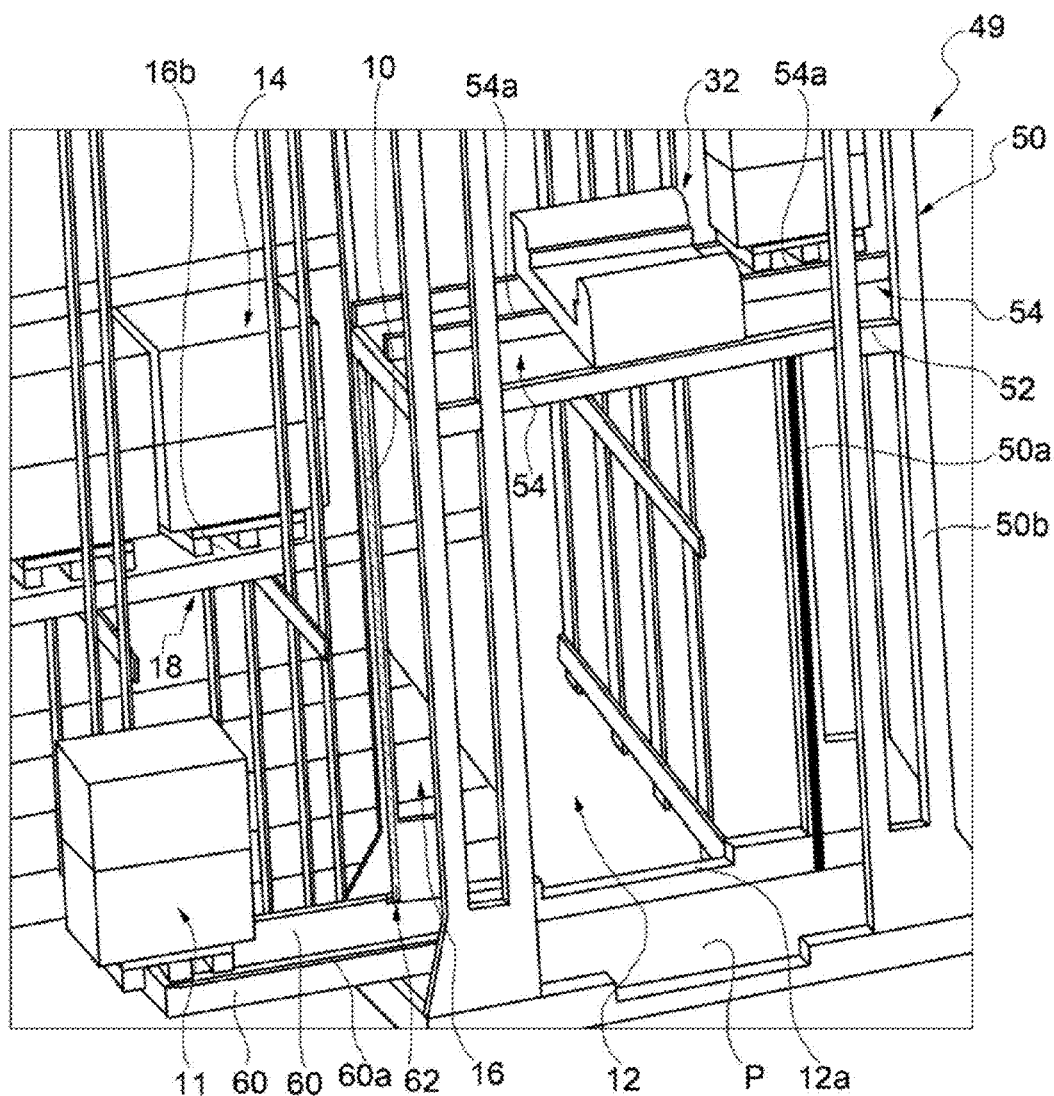
FIG. 5 is a schematic perspective view of a second detail of the warehouse in FIG. 1.

According to a preferred embodiment of the warehouse, the data representations (as already mentioned, in the embodiment shown in the FIGS. 1, 3, 4 and, as it will be noticed, also in FIG. 6, such representations are linear barcodes) represent a separate plurality of alpha-numerical data, identifying a plurality of reference points or ranges 10. Each reference point or range 10 is associated with a point or a length of the primary or secondary paths, and it is univocally identified within the warehouse 9. Some points or lengths correspond to the positions of a box 16*b* for accommodating one or more cargo units 11 (FIG. 5). A virtual mapping of all the reference points 10 provided in the warehouse is carried out. This virtual mapping is stored in a computing processing unit (not illustrated). According to a convenient embodiment, a single processing unit is provided for the entire warehouse 9. According to non-illustrated embodiments, the processing unit may be located on the shuttle 32 and/or the satellite 34.

When the withdrawal or deposition of a cargo unit 11 at a particular box 16*b* in the warehouse 9 is set, the processing unit identifies the reference point or range 10 corresponding to the selected box 16*b*. The distribution of the reference points or ranges 10 in the warehouse has not to necessarily follow a pre-ordered numerical sequence. Such a sequence may also be random, since the control of the shuttles and the satellites positioning occurs according to discrete points, and not according to (absolute or incremental) distances.

The processing unit sends to the self-propelled apparatus 30 the instruction to reach the reference point or range 10 associated with the box 16b. The self-propelled apparatus 30 travels along the main aisle 12 until the vertical edges 33b of the seat 33a of the shuttle 32 overlap with the projections, with respect to a plane parallel to the plane identified by the vectors x and z, of the inner faces 19b of the two consecutive secondary guides 18 bounding the secondary path 16 of the shelving 13 in which the reference point 10 where the cargo unit 11 has to be withdrawn or deposited is located.

According to a preferred embodiment of the invention, the movement of the self-propelled apparatus 30 and the proper mutual positioning between the self-propelled apparatus 30 and the secondary path 16, containing the box 16b, are controlled by a sensor 38, mounted on board of the shuttle 32. In a preferred, yet non-limiting embodiment, the sensor 38 is a reading or detection device of the optical type. According to a further embodiment (not illustrated), the shuttle 32 may also comprise multiple sensors 38.

The sensor 38 is able to detect the exact location of the self-propelled apparatus 30 or the single shuttle 32 on the main path 12 by reading and decoding the reference points or ranges 10 represented by the bar code 26 on the primary guide 24.

If the cargo unit 11 rests on the uprights 36 of the shuttle 32, the satellite 34 lifts, by means of the plate 35a, the cargo unit 11, disengaging it from the shuttle 32. The satellite 34 moves along the secondary path 16, sliding on the projections 19d of the secondary guides 18, and transports the cargo unit along the secondary path 16 to reach the position corresponding to the box 16b identified by the reference point or range 10.

According to a preferred embodiment of the invention, the movement of the satellite 34 and the proper positioning of the satellite 34 at the box 16b are controlled by a sensor 48, mounted on board of the satellite 34. In a preferred, yet non-limiting embodiment, the sensor 48 is a reading or detection device of the optical type. According to a further embodiment (not illustrated), the satellite 34 may also comprise multiple sensors 48.

The sensor 48 is able to detect the exact location of the satellite 34 on the secondary path 16 by reading and decoding the reference points or ranges 10 represented by the bar code 22 on the secondary guide 18.

Once it is in place, the satellite 34 lowers the plate 35a, resting the pallet 11a of the unit 11 on the planar surfaces 19a of the guides 18. When the satellite has completed the deposition operation of the cargo unit 11, it moves back along the secondary path 16 up to a threshold 16a of the secondary path 16.

If the cargo unit 11 is housed in the box 16b, the satellite 34 disconnects from the shuttle 32 and moves along the secondary path 16, sliding on the projections 19d of the secondary guides 18, to reach the position corresponding to the box 16b identified by the reference point or range 10 associated with the box 16b.

The satellite 34 lifts, by means of the plate 35a, the cargo unit 11, disengaging it from the guide 18, and moves back along the secondary path 16 up to a threshold 16a (FIG. 4) of the secondary path 16, transporting the cargo unit 11 along the secondary path 16.

While carrying out the operations performed by the satellite 34, the shuttle 32 is free to perform other operations, without necessarily having to wait for the return of the satellite.

In an embodiment of the invention (not illustrated), two or more shuttles 32 and/or two or more satellites 34 are provided in the warehouse; in theory, a shuttle 32 can discharge the satellite 34 at a first secondary path and, while the satellite performs its operations, the shuttle is free to withdraw a further satellite in a second secondary path other than the first one.

Furthermore, in an embodiment of the invention, the warehouse is provided with a loading and/or unloading station 60 for those cargo units 11 that have to be inserted or withdrawn from the warehouse (FIG. 4). Advantageously, the loading and/or unloading station 60 is located at an end 12a of the main aisle 12, at the level of a floor P considered as the base surface of the entire warehouse.

In a further embodiment (not illustrated), loading and/or unloading stations 60 are provided at two or more central aisles 12.

Figure 6:
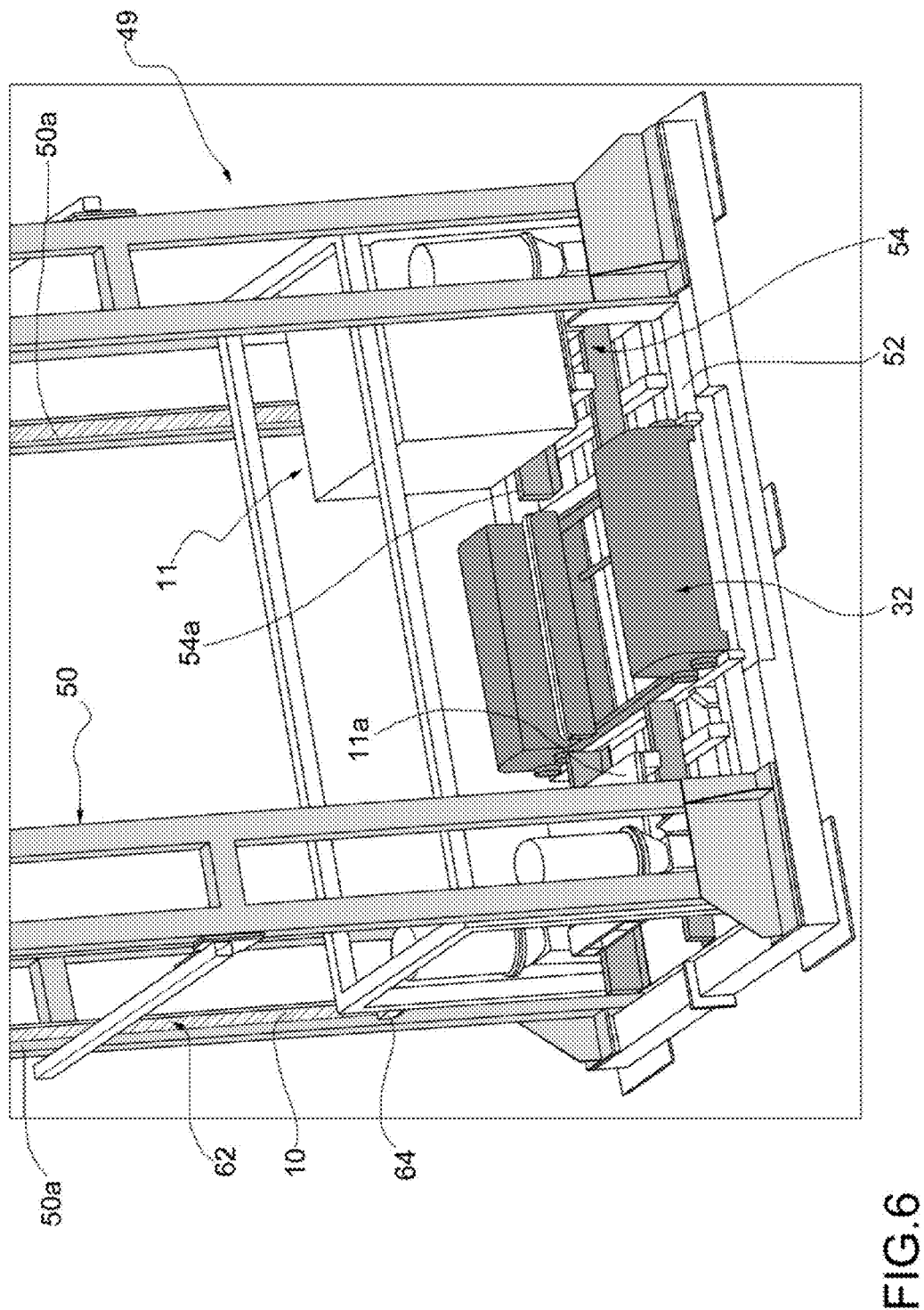
FIG. 6 is a schematic perspective view of a detail of the warehouse in FIG. 5.

The stations 60 may have sliding guides or conveyor belts 60a, receiving from or loading on the shuttle 32 the cargo units 11, either directly or, as illustrated in the FIGS. 5 and 6, via intermediate stations 54, which are provided with sliding guides or conveyor belts 54a.

In a preferred embodiment, the shuttle 32 and the intermediate stations 54 may be accommodated in a lifting platform 52, supported by uprights 50 of a lifting structure 49. The lifting structure 49 allows to vertically move the self-propelled apparatus 30 or only the shuttle 32, so that the apparatus or the shuttle can pass on the different central aisles corresponding to each floor 14 of the shelving 13.

As shown in FIG. 5 and, in more detail, in FIG. 6, one of the uprights 50 provides a third location data representation 62 located on an inner face 50a of the upright. A third sensor 64 is mounted on the lifting platform 52. The third sensor 64 is configured to read the data of the third location data representation 62. In this example, the data representation 62 is a representation of the optical type, in the form of a linear bar code. The observations given for the representations 22, 26, about the data representation mode, the application surface of the representation 62 (that may be applied on one, or according to a non-illustrated embodiment, on multiple faces of the section bar forming the upright), the upright on which the representation (that may be applied on one, or in a non-illustrated embodiment, on multiple uprights) is provided, the connection system of the representation 62 to the upright 50, the material for manufacturing the representation 62 apply also to the data representation 62.

According to a further embodiment (not illustrated), the lifting platform 52 may also comprise multiple sensors 64.

The sensor 64 is able to detect the exact vertical height (i.e., along the vector z) where the lifting platform 52 is located with respect to the upright 50. The sensor 64 detects such position by reading and decoding the reference points or ranges 10 represented by the bar code 62 on the upright 50.

The data representations 22, 26, 62 provide a location datum along the transversal (y), longitudinal (x), and vertical (z) directions, respectively. These available data allow to obtain a tridimensional mapping of the warehouse 9.

Furthermore, the lifting structure 49 can move independently of the presence of the apparatus 30, of the shuttle 32 or one or more cargo units 11 on the intermediate stations 54, resulting in a further optimization of the operative times.

Figure 2B:
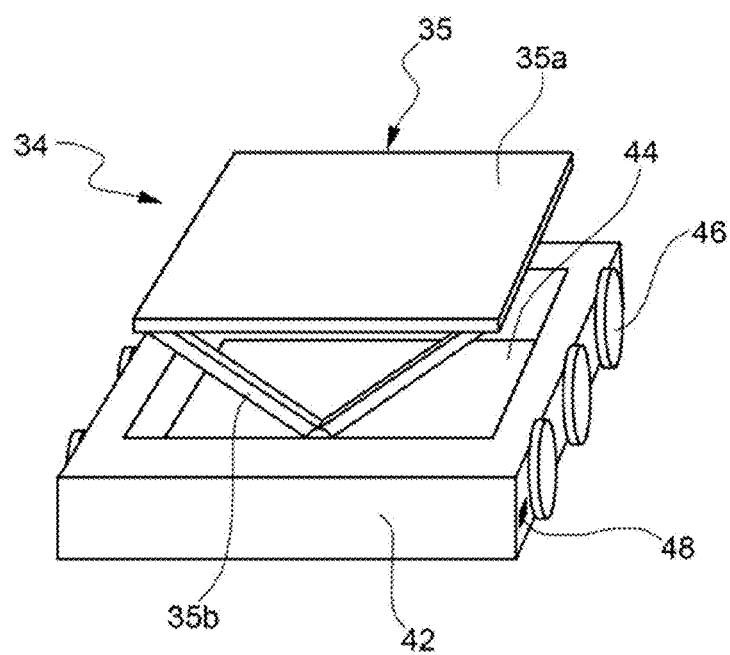
FIG. 2B is a schematic axonometric view of a second vehicle provided in the warehouse of FIG. 1.
Figure 2C:
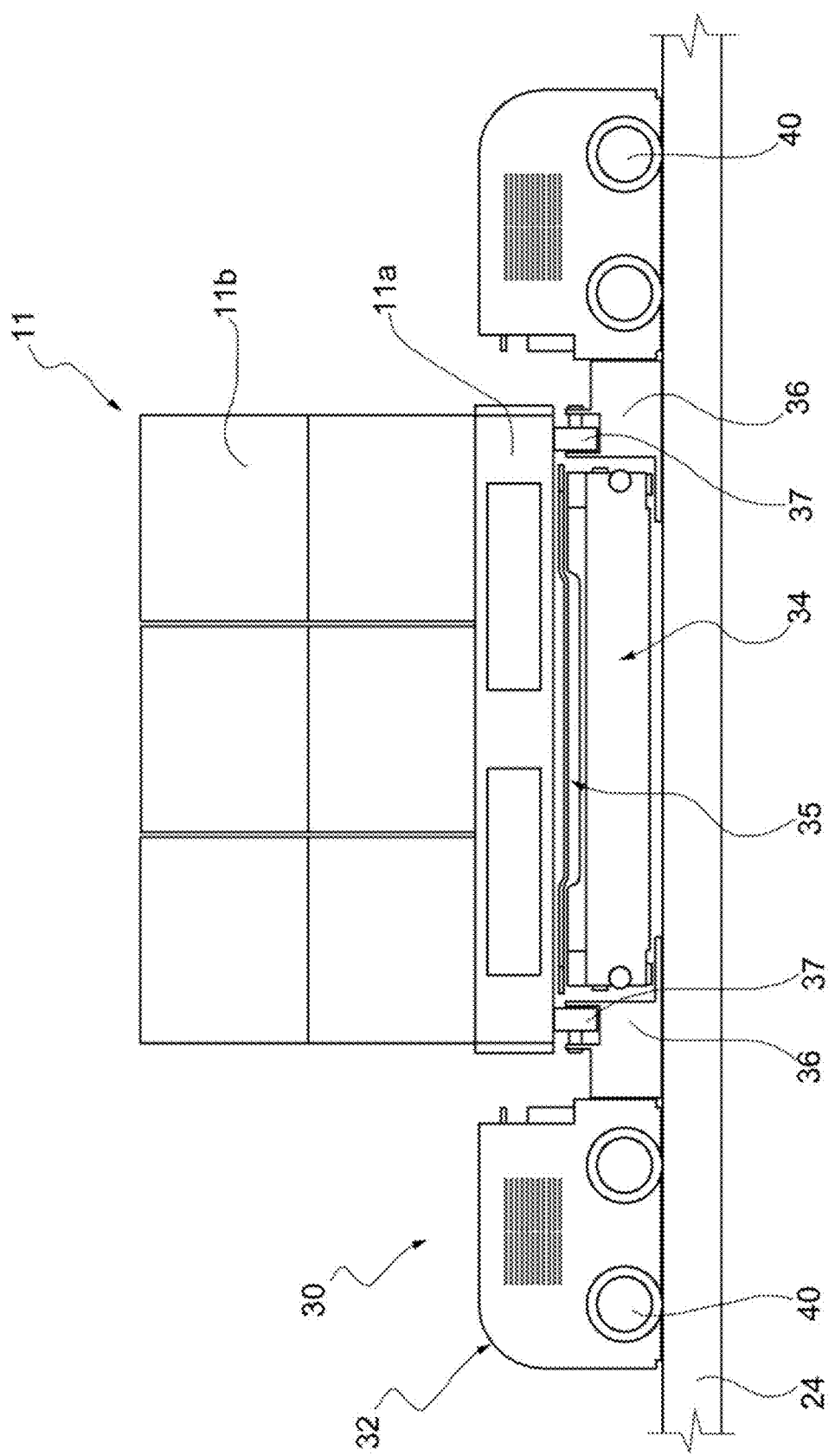
FIG. 2C is a schematic side view of a self-propelled apparatus comprising the vehicles in the FIGS. 2A and 2B.

A possible initial step of the storing method is to put a cargo unit on the loading station 60; the lifting platform 52 of the lifting structure 49 is lowered to the floor P plane, i.e., forming a contiguity between the sliding guides 60a of the loading/unloading stations 60, the sliding guides 54a of the intermediate stations 54 and/or chain rolls 37 located on the uprights 36 of the structure 33 of the shuttle 32 (FIGS. 2A, 5, and 6). By means of the sliding guides or conveyor belts 60a, the cargo unit passes to an intermediate station 54, from which the load is transferred to the shuttle, by means of telescopic forks or chain rolls 37 of the shuttle 32. The configuration where the shuttle 32 comprises the rolls 37 is a preferred one, since it allows the shuttle loading and/or unloading the cargo unit independently of the presence on board of the satellite, i.e., housed in the seat 33a.

Conversely, if the cargo unit has to be withdrawn from the warehouse, the just described method is inverted: the shuttle 32 passes the load to the intermediate station 54, from which the load is further transferred to the unloading station 60, where it is withdrawn.

If the withdrawal and/or deposition of a cargo unit require that the main aisle 12 contiguous to a floor 14 other than the first floor of the shelving 13 has to be reached, then the above-described operations are to be completed with a step in which the self-propelled apparatus 30, or only the shuttle 32, are loaded onto the lifting platform 52 and vertically translated via the platform, allowing the apparatus 30, 32, 34 to reach any point of the warehouse.

As regards the sensors for detecting the location data 38, 48, 64, such sensors are preferably of the optical type. The particular technology of the sensor will be able to vary according to the needs. For example, optical readers with light sources associated with photodiodes, laser light sources, LED bar light sources, CCD (Charged Coupled Device) sensors, image reading systems of the photo camera type, readers of the "Large field-of-view" type using high resolution photo cameras able to simultaneously capture information from a multiplicity of bar codes, etc., may be used.

In other embodiments, the sensors 38, 48, 64 can be of a different type, in accordance with the type of data representation, for example, magnetic sensors.

Therefore, the advantages achieved by the present invention are:
the accuracy with which it is possible to determine the location of the vehicles within the warehouse, without incurring in errors and uncertainties due to structural tolerances, vibrations, thermal expansions, slips, wear; and
the possibility to perform, in the same time, a higher number of operations compared to automated warehouses contemplated by the prior art.

A number of aspects/embodiments of the invention have been described. It is to be understood that each aspect/embodiment may be combined with any other aspect/embodiment. Moreover the invention is not restricted to the described embodiments, but may be varied within the scope of the appended claims.

The invention claimed is:
1. An automated warehouse, comprising:
at least one main path identified between parallel, mutually facing primary guides;
a plurality of secondary paths, perpendicular to the main path and identified by pairs of parallel, mutually facing secondary guides, along which storage stations are defined, each station being adapted to receive at least one cargo unit;
at least one self-propelled apparatus for handling the cargo units, the apparatus comprising a main self-propelled vehicle, movable along the guides of the main path, said main self-propelled vehicle having at least one seat for accommodating at least one auxiliary self-propelled vehicle movable along the guides of the secondary paths;
wherein
a first location data representation, readable by at least a first optical sensor, is provided along at least one face of at least one of said primary guides of the main path;
a second location data representation, readable by at least a second optical sensor, is provided along at least one face of at least one of said secondary guides of the secondary path;
the main self-propelled vehicle comprises at least one first optical reading device, configured to read the first data representation;
the auxiliary self-propelled vehicle comprises at least one second optical reading device, configured to read the second data representation; and
wherein the data representations identify absolute positions of reference points or ranges along the main and secondary paths within the automated warehouse.

2. The automated warehouse of claim 1, wherein each storage station of the cargo unit is identified, in the warehouse, by a corresponding reference point or range.

3. The automated warehouse of claim 1, wherein the first data representations are positioned on a face of a single primary guide facing toward a centerline of the main path, and wherein in each secondary path the second data representations are positioned on a face of a single secondary guide facing toward a centerline of the secondary path.

4. The automated warehouse of claim 1, wherein the warehouse comprises at least a shelving having one or more vertically overlying floors, each floor comprising at least one secondary path, a respective main path being flanked to each floor.

5. The automated warehouse of claim 1, wherein a lifting station is provided along the main path or in a point, adjacent to said path, the lifting station comprising vertical uprights to support and guide at least one lifting platform adapted to accommodate at least one main self-propelled vehicle and/or at least one station for supporting and moving cargo units; a third position data representation is provided along at least one of said uprights, and a third optical sensor, configured to read the data of the third position data representation, is mounted on the lifting platform.

6. The automated warehouse of claim 1, wherein the data representations comprise linear, matrix or three-dimensional barcodes.

7. The automated warehouse of claim 1, wherein at least one loading and unloading station is arranged at at least one end of the main path, the loading and unloading station being operatively associated to the support and movement stations on the lifting platform, said loading and unloading station being adapted to move a cargo unit.

8. The automated warehouse of claim 1, wherein the auxiliary self-propelled vehicle is movable independently from the main self-propelled vehicle.

9. A method for storing and withdrawing cargo units in an automated warehouse, the warehouse comprising:
at least one main path identified between parallel, mutually facing primary guides;
a first location data representation, provided along the main path and readable by at least a first optical sensor;
a plurality of secondary paths, perpendicular to the main path and identified by pairs of parallel, mutually facing secondary guides, along which storage stations are defined, each station being adapted to receive at least one cargo unit;

a second location data representations, provided along the secondary paths and readable by at least a second optical sensor;

at least one self-propelled apparatus for handling the cargo units, the apparatus comprising a main self-propelled vehicle, movable along the guides of the main path and having a first optical sensor, said main self-propelled vehicle having at least one seat for accommodating at least one auxiliary self-propelled vehicle;

at least one auxiliary self-propelled vehicle, movable along the guides of the secondary paths and having a second optical sensor;

a lifting station located along or adjacent to said main path, the lifting station comprising vertical uprights to support and guide at least one lifting platform;

at least one lifting platform, supported and guided by the vertical uprights, said platform being adapted to accommodate at least one main self-propelled vehicle for moving cargo units;

a third position data representation provided along at least one of said uprights;

a third optical sensor, configured to read the data of the third position data representation, said third optical sensor being mounted on the lifting platform;

the method comprising:

a) setting the position of the storage station where a cargo unit is to be deposited or withdrawn;
b) identifying a reference point associated with the above mentioned position;
c) sending to the main self-propelled vehicle a signal indicative of information relating to the reference point to be reached;
d) upon checking the sequence of positions assumed by the main self-propelled vehicle by reading the first data representations via the first sensor, moving the main self-propelled vehicle along the main path, up to make vertical edges of the seat overlap with the projections, with respect to a plane parallel to the plane defined by vectors (x) and (z), of the inner faces of the two consecutive secondary guides bounding the secondary path of the shelving in which the reference point is located where the load unit has to be withdrawn or deposited;
e) upon checking the sequence of positions reached by the auxiliary self-propelled vehicle by reading the second data representations through the second sensor, moving the auxiliary self-propelled vehicle along the secondary path in which the reference point is located where the cargo unit has to be withdrawn or deposited;
f) moving the auxiliary self-propelled vehicle along the secondary path to reach the reference point where the cargo unit has to be withdrawn or deposited;
g) withdrawing from or depositing the cargo unit at the reference point by means of the auxiliary self-propelled vehicle;
h) giving instructions to the auxiliary self-propelled vehicle to return to the seat of the main self-propelled vehicle, by checking the sequence of positions assumed by the auxiliary self-propelled vehicle by reading the second data representations, via the second sensor;
i) giving instructions to the main self-propelled vehicle to return to the loading and unloading station, depositing the cargo unit, carried by said main vehicle, on the station and/or loading a new cargo unit to be placed in the shelving;
j) upon restarting from step a), and upon checking the sequence of positions reached by the lifting platform by reading the third data representations, via the third sensor, vertically moving the main self-propelled vehicle by means of the lifting platform of the lifting station, until said main vehicle is brought at the floor of the shelving in which the reference point is, where the cargo unit has to be deposited and/or withdrawn; and
k) repeating at least once steps c) to j).

10. The method of claim 9, wherein step g) is followed by a step of moving the main self-propelled vehicle, independently of the movement of the auxiliary self-propelled vehicle, to a new reference point along the main path.

* * * * *